Nov. 6, 1928.  
N. B. GREEN  
1,690,633  
MOTION PICTURE PROJECTOR  
Filed Aug. 15, 1925   2 Sheets-Sheet 1
FIG_1_
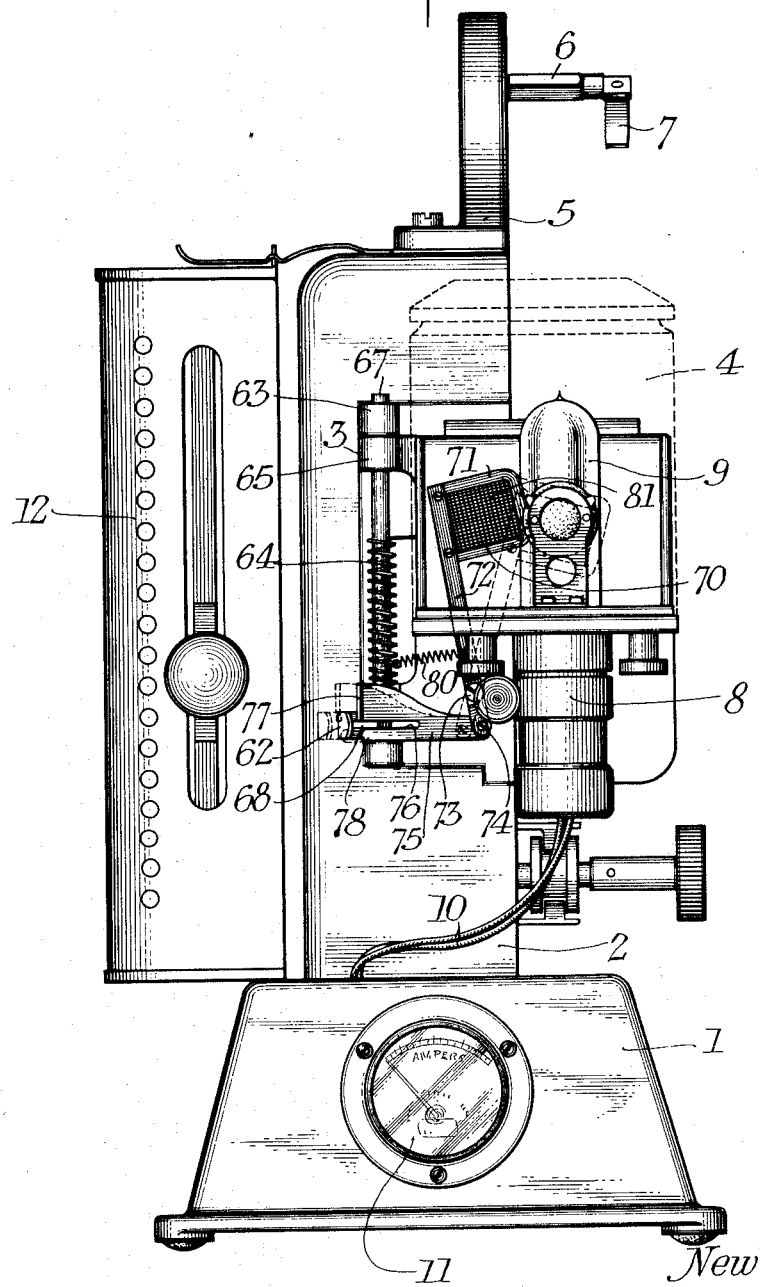
Newton B. Green,
INVENTOR.
BY R. L. Stinchfield
N. M. Perrine
ATTORNEYS.

Nov. 6, 1928.
N. B. GREEN
MOTION PICTURE PROJECTOR
Filed Aug. 15, 1925
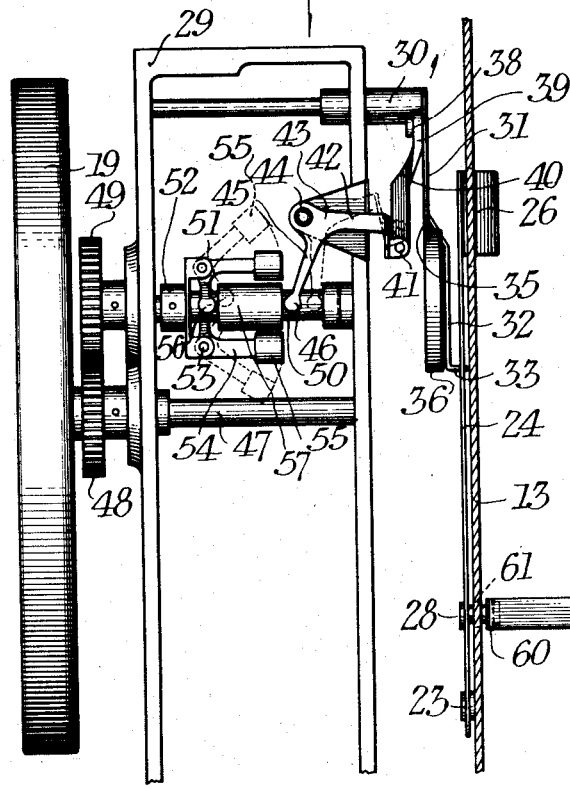
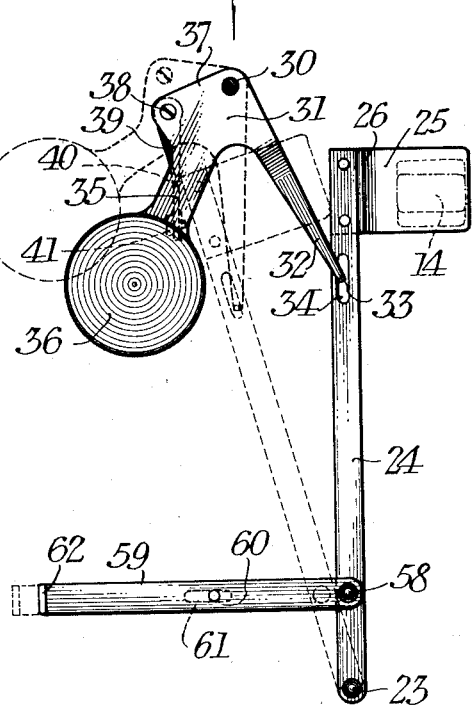
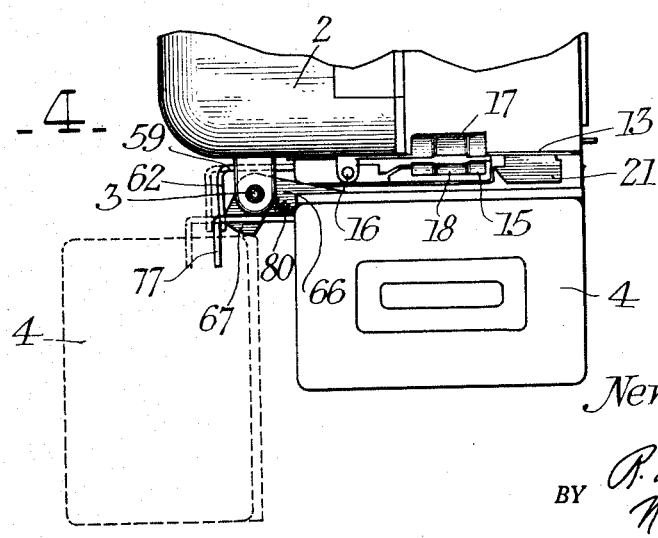
Newton B. Green,
INVENTOR.

Patented Nov. 6, 1928.

1,690,633

UNITED STATES PATENT OFFICE.

NEWTON B. GREEN, OF ROCHESTER, NEW YORK, ASSIGNOR TO EASTMAN KODAK COMPANY, OF ROCHESTER, NEW YORK, A CORPORATION OF NEW YORK,

MOTION-PICTURE PROJECTOR.

Application filed August 15, 1925. Serial No. 50,444.

This invention relates to motion picture projecting apparatus and more particularly to mechanism providing a reliable safeguard against overheating the film, while at the same time permitting sufficient light to reach the film to permit of projection whether the film is moving or not. The object of my invention is to provide in addition to the safety shutter of a familiar type controlled by the movement of the film, a second shutter which will transmit enough light for projection and at the same time dissipate heat rays and which may be interposed at the will of the operator into the projection beam. This second shutter is so connected to the regular safety shutter that the latter is removed from the beam when the second shutter is interposed. The regular safety shutter is, moreover, removed from the beam by the movement of the lamp house, so that there are three controls for it, the usual governor, the lamp house and the second safety shutter. Other objects and advantages of my invention will appear in the following description in which reference is made to the accompanying drawing in the several figures of which the same reference characters are used throughout to designate the same parts, and in which—

Fig. 1 is an end view of a projector, the lamp house being indicated in dotted lines in part;

Fig. 2 is a side view of the governor and safety shutter mechanisms;

Fig. 3 is a view from the right of Figure 2 showing the safety shutter elements only;

Fig. 4 is a plan showing the lamp house, and a portion of the main housing to which it is hinged.

In order to illustrate my invention it is shown as embodied in a projector of the type disclosed in the application of Tessier, Serial Number 586,916, filed September 1, 1922, and the patent to Tessier, No. 1,598,944, granted September 7, 1926.

In Fig. 1 is shown a projector having a base 1 supporting a main housing 2, to which is hinged at 3 a lamp house 4. To the top of the main casing is attached an arm 5 carrying a shaft 6 and latch 7 for supporting and securing a reel of film. Within the lamp house is the lamp socket 8 supporting an incandescent lamp 9 to which current is supplied through wires 10. The base 1 may carry a suitable ammeter 11, and a resistance housing 12 is shown in position at one side of the projector.

The rear wall 13 of the main housing to which the lamp house is hinged has a window 14 through which light may be projected and a gate member 15 is pivoted at 16 to the wall 13. Coacting guide plates 17 and 18 are carried by the wall and gate member respectively for guiding the film past the window 14 therein. The gate is adapted to be held in closed position by a finger latch 21.

Pivoted at 23 is an arm 24 carrying a safety shutter 25 which may be opaque material or of material not transmitting enough light rays for projection. The arm 24 is within the main housing 2, but the shutter 25 is offset by an elbow 26 which passes through a suitable aperture (not shown) in the wall 13. The shutter may be swung from a position in registration with the window 14 as indicated in full lines in Fig. 3 to a position at one side indicated in dotted lines.

Within the main housing 2 is a fixed frame 29 to which is pivoted at 30 an elbow lever 31, one arm 32 of which has in its end a pin 33 engaging in slot 34 of arm 24, and the other arm 35 of which carries at its end a weight 36. On an offset 37 of arm 35 and intermediate weight 36 and pivot 30 is pivoted at 38 one end of a link 39, which is twisted at a right angle at 40 and at its other end 41 is pivoted to an arm 42 of elbow lever 43 which in turn is pivoted at its elbow 44 to a part of the fixed frame 29. The other arm 45 of the elbow lever 43 has a rounded bearing end 46.

The flywheel 19 is carried on a shaft 47 supported by the frame 29. On this shaft is a gear 48 intermeshing with and driving a second gear 49 on shaft 50 mounted in suitable journals on frame 29. This shaft carries a centrifugal governor 51 comprising a collar 52 fixed to the shaft 50 and having pivoted thereto at 53 the crank arms 54 each of which carries a weight 55 and a bearing arm 56 the latter bearing against one end of the cylinder 57 sliding on shaft 50. The other end of the cylinder is engaged by the member 46.

It is understood that the projector includes other mechanism not shown and not necessary for understanding of the invention, which is connected with the mechanism shown and which draws the film through the projector, so that the speed of the shaft 50 has definite relation to the speed of the other moving parts and of the film.

As is obvious, when the mechanism, including shaft 50, is in motion the weights 55 tend to fly outwardly, as indicated in dotted lines in Fig. 2, moving the cylinder to the right and swinging elbow lever 43, which results in the movement of elbow lever 31 and safety shutter 25 from the full line position in Fig. 3 to the dotted line position.

There is provided mechanism whereby the opening of the lamp house will move the safety shutter out of alignment with the window 14. To the arm 24 is pivoted, by means of bolt 58, one end of a bar 59, the bolt 58 extending through an aperture (not shown) in the wall 13. The bar 59 carries a pin 60 extending into a guide slot 61 in wall 13 and indicated in dotted lines in Fig. 3. The bar 59 extends beyond the pivotal connection 3 and at its end is an outwardly turned lug 62. The pivotal connection comprises apertured lugs 63 extending from the casing 2 and lugs 65 and 66 extending from the lamp house 4, a pivot pin 67 passing through these lugs. A spring 64 tends to hold the lamp house in closed position. The lower lug 66 has a cam extension 68 protruding beyond the pin 67 and adapted to engage the lug 62. As the lamp house 4 is turned on its hinge, this cam 68 moves the lug 62, bar 59 and arm 24, thus also moving the safety shutter 25 and lifting the weight 36, so that as the lamp house is swung to open position, the safety shutter is moved out of registration with the window 14.

Carried within the lamp house between the lamp and the gate is a second shutter 70 comprising a frame 71 carried on an arm 72 which is hinged at 73 to the lamp house, and at 74 to a member 75 having a slot 76 by which it is guided on the cam member 68. This member 75 has a finger-piece 77 above the slot, and an abutment 78 below it. The finger-piece 77 extends over and beyond the finger-piece or lug 62. The arm 72 is normally held in a position shown in full lines in Fig. 1 by a spring 80. Within the frame 71 is a material transmitting enough light to permit of the satisfactory projection of images from the window 14 when the film is still, but dissipating enough of the heat rays to prevent injury to the film. In the form shown, this material is indicated at 81 as a copper wire cloth or net.

In operation, if the user wishes to view one of the individual pictures on the motion picture film, he stops the movement of the mechanism, whereupon the safety shutter 25 is interposed between the light and the gate shutting off the illumination. The user then moves finger-piece 77 to the left, thereby moving the screen 81 into the position shown in dotted lines in Fig. 1 between the lamp and the gate. At the same time, the abutment 68 engages the lug 62 and moves the safety shutter 25 from full to dotted line position (Figure 3). In Fig. 4 the two positions of the lugs 62 and 77 are indicated as well as the open position of the lamp house.

It is apparent from the above description that I have provided for the shutter 25, in addition to the direct control, by means of lug 62, three automatic controls which thoroughly safeguard the film from any accidental exposure to injurious heat rays, while at the same time permitting projection of still pictures.

It is to be understood that the above disclosure is by way of example and that I contemplate as included in my invention all such modifications and equivalents as fall within the scope of the appended claims.

Having thus described my invention, what I claim as new and desire to secure by Letters Patent is:

1. In a motion picture projector, a gate, a first shutter having a normal position in registration with the gate, a lamphouse adapted to illuminate the gate and hinged to swing to an inoperative position, a member connected to the shutter, a cam connected to the lamphouse and operative to engage said member and move said shutter out of registration with the gate as the lamphouse is swung, and a second shutter having a normal position out of registration with the gate and having a member adapted to engage and move said first named member whereby the second shutter may be actuated to be moved into registration with the gate and the first shutter may be thereby moved out of registration with the gate.

2. In a motion picture projector, a gate, a lamphouse having a normal position in alignment with the gate and movable therefrom, film moving mechanism, a first safety shutter having a normal position in alignment with the gate, a second safety shutter having a normal position out of alignment with the gate and movable to a second position in alignment with the gate, the first shutter being automatically removable from its normal position when the mechanism is operating, and force transmitting connections between the first shutter and the second shutter and between the first shutter and the lamphouse whereby the first shutter will be automatically removed from its normal position when the lamphouse is out of alignment with the gate or when the second shutter is in its second position.

Signed at Rochester, New York, this 12th day of August 1925.

NEWTON B. GREEN.